Patented Dec. 29, 1931

1,838,232

UNITED STATES PATENT OFFICE

PAUL NAWIASKY AND EMIL KRAUCH, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

VAT DYESTUFFS OF THE PYRAZOLANTHRONE SERIES

No Drawing. Application filed August 2, 1929, Serial No. 383,150, and in Germany August 9, 1928.

The present invention relates to the production of vat dyestuffs of the pyrazolanthrone series.

We have found that new vat dyestuffs are obtained by condensing a pyrazolanthrone of the formula:

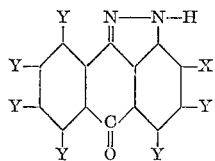

with an 1-aminoanthraquinone of the formula:

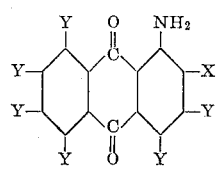

in which one X stands for halogen, the other for hydrogen and Y for hydrogen or any substituent, by means of an alkaline condensing agent. The condensation is preferably carried out in an organic diluting medium, such as, for example, nitrobenzene, naphthalene and the like, and in the presence, if desired, of a condensing catalyst, such as metals or metal compounds, for example, copper, its oxides, salts or mixtures thereof. Judging by the properties of the new dyestuffs it is probable that not only does a linkage of carbon and nitrogen occur with the splitting out of hydrogen halide, but that a further condensation occurs. When employing pyrazolanthrone and 1-amino-2-halogenanthraquinone as initial materials, the reaction proceeds probably according to the following formulæ:

When employing pyrazolanthrones which are halogenated in the 2-position, and 1-aminoanthraquinone or substitution products of the same as initial materials, it is generally speaking advantageous to employ an excess of the 1-aminoanthraquinone in order to prevent the formation of the red vat dyestuffs which are obtainable by heating 2-halogenpyrazolanthrone or substitution products thereof with an acid-binding agent and a metal such as copper.

The new products are strong vat dyestuffs having good properties of fastness.

The dyestuffs may be purified by recrystallization from organic solvents of high boiling point or by reprecipitation by dilution of their solutions in sulphuric acid in which they may be dissolved usually giving from blue to blue green solutions.

The properties of the condensation products can be improved by halogenation which is performed by the action of a halogenating agent on the condensation products, preferably in an organic or inorganic dissolving medium, such as, for example, nitrobenzene, sulphuric acid, oleum, chlorsulphonic acid and the like. By the said halogenation the shade of the dyestuffs generally speaking becomes clearer and moreover an improvement in the fastness to chlorine and a change in shade frequently take place.

The following examples will further illustrate the nature of this invention, but the invention is not restricted to these examples. The parts are by weight.

Example 1

11 parts of pyrazolanthrone are heated to boiling together with 15.1 parts of 1-amino-2-brom-anthraquinone, 10 parts of potassium

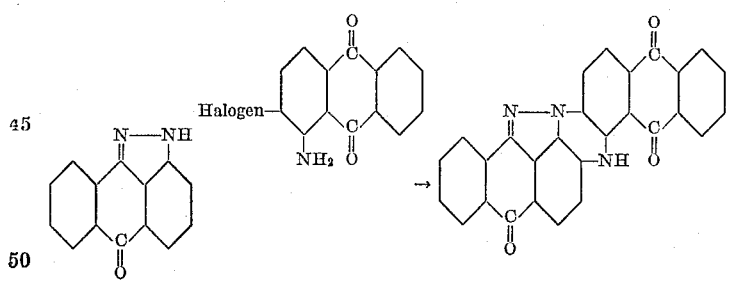

carbonate, 0.5 part of copper powder and 200 parts of nitrobenzene until no further increase in the formation of dyestuff occurs. The whole is filtered off by suction while still hot and the undissolved matter is freed from the solvent and salts in any known manner. The crude dyestuff may suitably be purified by crystallization from its solution in organic solvents, for example o-dichlorbenzene or trichlorbenzene, in which it is comparatively readily soluble in the hot, or by fractional precipitation from a solution in sulphuric acid. By diluting a concentrated solution of the crude product in 10 parts of concentrated sulphuric acid with 20 parts of a sulphuric acid of 50° Bé. mainly only the pure dyestuff is precipitated. The two purification processes may also be combined. When in the pure state, the dyestuff is a dark powder which dissolves in concentrated sulphuric acid giving a brilliant blue coloration. It dyes cotton from a violet vat powerful blue violet shades.

*Example 2*

11 parts of pyrazolanthrone are heated to boiling with 15.9 parts of 1-amino-2-brom-4-hydroxyanthraquinone, 10 parts of potassium carbonate and 200 parts of nitrobenzene for a period of about 20 hours. The working up and the purification of the dyestuff obtained are carried out in the manner described in Example 1. When in the pure state, the dyestuff is a dark powder which dissolves in concentrated sulphric acid giving a green blue coloration. It dyes cotton from a blue vat deep blue green shades which by chlorination are changed to grey.

*Example 3*

A mixture of 11.6 parts of 2-brompyrazolanthrone, 17.6 parts of 1-aminoanthraquinone, 7 parts of potassium carbonate, 0.4 part of copper powder and 100 parts of nitrobenzene is heated to boiling, while stirring, until the formation of the dyestuff no longer increases. The whole is allowed to cool and the dyestuff of which the greater part has already separated out, is separated from the solvent and from the inorganic constituents of the reaction mixture in the manner already known. For example it may first be diluted with alcohol for the purpose of separating it from nitrobenzene and may then be filtered off by suction and washed with alcohol and water. In order to separate it from the excess of aminoanthraquinone the crude dyestuff may be extracted for example, with 1000 parts of sulphuric acid solution containing 70 per cent of $H_2SO_4$. For the purpose of bringing the dyestuff into a pure form it is preferable to crystallize it from boiling dichorbenzene. The dyestuff is very similar to that described in Example 1.

*Example 4*

18 parts of 2-brompyrazolanthrone, 29 parts of 1-amino-4-hydroxyanthraquinone, 10.6 parts of potassium carbonate, 1.2 parts of copper powder and 180 parts of nitrobenzene are heated to boiling under a reflux condenser, while stirring, until the formation of dyestuff no longer increases. The working up is carried out as described in the foregoing example, but preferably the dyestuff should be crystallized from trichlorbenzene. As regards its properties the dyestuff practically corresponds to the dyestuff described in Example 2.

*Example 5*

18 parts of 2-brompyrazolanthrone, 29 parts of 1.4-diaminoanthraquinone, 10.3 parts of potassium carbonate, 1.2 parts of copper powder and 180 parts of nitrobenzene are heated to boiling until the formation of dyestuff is complete. The working up is then carried out as described in Example 3. The new dyestuff dissolves in concentrated sulphuric acid giving a pure blue coloration and may be obtained from this solution in the form of a dark green flocculent precipitate by pouring the solution into water. It dyes cotton from a blue vat blue shades and the dyeings are converted in air into greenish grey fast to washing, and these change to Bordeaux red by treatment with chlorine.

When 1-amino-5-benzoylaminoanthraquinone is employed instead of 1.4-diaminoanthraquinone and the same procedure is followed, a dyestuff is obtained which dissolves in concentrated sulphuric acid giving a greenish blue coloration. The dyestuff dyes cotton from a violet blue vat violet shades, and the dyeings change by exposure to the air, or more quickly by boiling with soap solution, into greenish grey shades.

*Example 6*

20 parts of the dyestuff obtainable according to Example 1 are dissolved in 200 parts of chlorosulphonic acid. 3 parts of iodine and 20 parts of bromine are then introduced and the solution is stirred for a period of half an hour at a temperature of 50° C. Another 10 parts of bromine are then introduced and the whole is stirred at the same temperature until the dyeings of a sample which has been taken out and worked up no longer show any change, which is usually the case after a period of about 1½ hours. The reaction mixture is then stirred into 200 parts of sulphuric acid of 66° Bé. strength, while avoiding an increase of temperature as far as possible, and the whole is finally diluted with 140 parts of water, also while avoiding an increase of temperature. The dyestuff which has separated out is then filtered off, washed carefully with water, dried and freed from impurities, if necessary, by boiling with suitable solvents for example, nitrobenzene. The dyestuff obtained contains about two atoms of bromine in each molecule of the dyestuff and dissolves in concentrated sulphuric acid giving a blue green coloration. By pouring the sulphuric acid solution into water a violet suspension is formed. The dyestuff dyes cotton from a red violet vat violet shades, and by oxidation in air and drying the color of the shades changes via blue violet into a blue of good fastness to chlorine.

*Example 7*

3 parts of the dyestuff obtainable according to Example 1 are suspended in 60 parts of nitrobenzene. Then, while stirring well, a mixture of 6 parts of concentrated hydrochloric acid and 28 parts of glacial acetic acid and a mixture of 3 parts of 30 per cent hydrogen peroxide and 12 parts of glacial acetic acid are allowed to run in gradually and as simultaneously as possible. The reaction mixture is then stirred at a temperature of about 90° C. until the dyeings of a sample which has been taken out and worked up no longer shown any change, which is usually the case after about 1½ hours. The dyestuff is then separated from the solvent or suspending agent employed in the manner already known. The dyestuff may be still further purified by boiling with suitable solvents, for example with nitrobenzene. In the pure state the dyestuff constitutes a dark powder having a metallic lustre and containing chlorine, which dissolves in concentrated sulphuric acid giving a pure blue green coloration, and by pouring this solution into water the dyestuff separates as a violet flocculent precipitate. It dyes cotton reddish blue shades having good fastness to chlorine from a red violet vat.

*Example 8*

20 parts of the dyestuff obtainable according to Example 4 are dissolved in 200 parts of chlorosulphonic acid, and 2 parts of iodine and 30 parts of bromine are introduced, the solution then being stirred for half an hour at a temperature of 50° C. Another 10 parts of bromine are then introduced and the whole is stirred until the dyeings of a sample which has been taken out and worked up show no further improvement in their fastness to washing, which is usually the case after about 1½ hours. The solution is then stirred into 200 parts of sulphuric acid, while avoiding an increase of temperature. The pure dyestuff is then precipitated by the addition of 140 parts of water, also while avoiding an increase of temperature as far as possible, filtered off, freed from sulphuric acid by washing with water and dried.

The dyestuff dissolves in concentrated sulphuric acid giving a bluish green coloration and is precipitated from this solution as a green flocculent precipitate by the addition of water. It dyes cotton from a blue vat blue shades which in the air become more green and similar to the dyeings obtained with the initial dyestuff, but they have a purer tone and a better fastness to washing than these.

What we claim is:—

1. As new articles of manufacture the vat dyestuffs probably corresponding to the general formula:

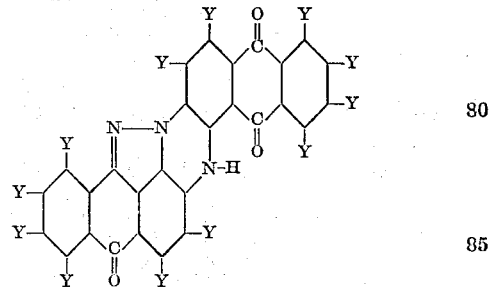

in which Y stands for hydrogen, halogen, a hydroxy or amino group, the dyestuffs crystallizing from nitrobenzene and being soluble in concentrated sulphuric acid giving from blue to blue green solutions and furnishing with an alkaline solution of hydrosulphite from blue to violet vats.

2. As a new article of manufacture the vat dyestuff probably corresponding to the formula:

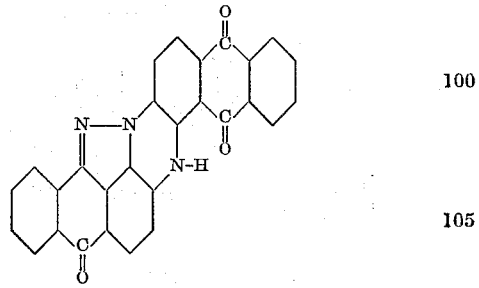

forming a dark powder, crystallizing from nitrobenzene, dissolving in concentrated sulphuric acid giving a brilliant blue coloration and dyeing cotton from a violet vat powerful blue violet shades.

3. A process of producing vat dyestuffs of the pyrazolanthrone series which comprises condensing a pyrazolanthrone of the formula:

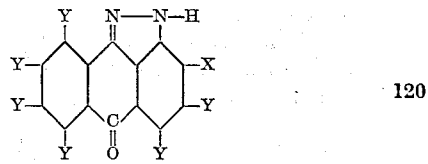

with an 1-aminoanthraquinone of the formula:

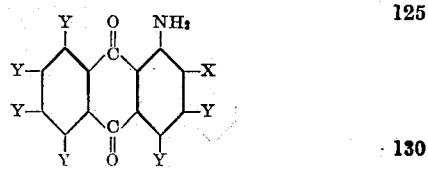

in which one X stands for halogen, the other for hydrogen, and Y for hydrogen, halogen, a hydroxy or amino group, by means of an alkaline condensing agent.

4. A process of producing vat dyestuffs of the pyrazolanthrone series which comprises condensing a pyrazolanthrone of the formula:

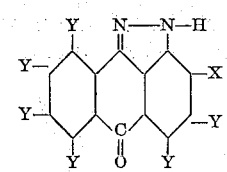

with an 1-aminoanthraquinone of the formula:

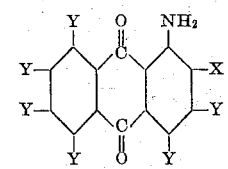

in which one X stands for halogen, the other for hydrogen, and Y for hydrogen or, halogen, a hydroxy or amino group, by means of an alkaline condensing agent in an organic diluting medium.

5. A process of producing vat dyestuffs of the pyrazolanthrone series which comprises condensing a pyrazolanthrone of the formula:

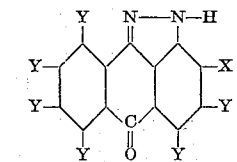

with an 1-aminoanthraquinone of the formula:

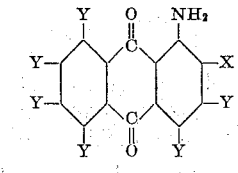

in which one X stands for halogen, the other for hydrogen and Y for hydrogen or, halogen, a hydroxy or amino group, by means of an alkaline condensing agent in an organic diluting medium in the presence of a condensing catalyst.

6. The process of producing the vat dyestuff probably corresponding to the formula:

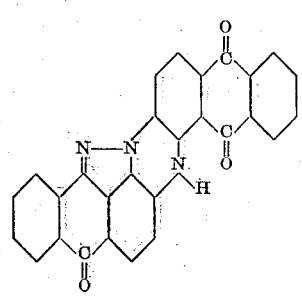

which comprises condensing pyrazolanthrone with 1-amino-2-bromanthraquinone in nitrobenzene by means of an alkaline condensing agent in the presence of copper powder.

7. A process of producing vat dyestuffs of the pyrazolanthrone series which comprises condensing a pyrazolanthrone of the formula:

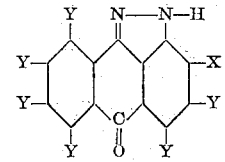

with an 1-aminoanthraquinone of the formula:

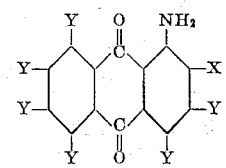

in which one X stands for halogen and Y for hydrogen or, halogen, a hydroxy or amino group, by means of an alkaline condensing agent and acting on the condensation product with a halogenating agent.

8. As a new article of manufacture the vat dyestuff probably corresponding to the formula:

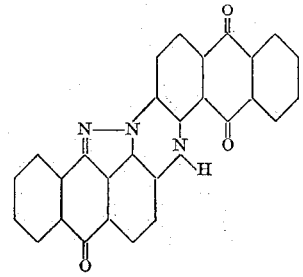

containing about two atoms of bromine in each molecule of the dyestuff, dissolving in concentrated sulphuric acid to give a blue green solution and dyeing cotton from a red violet vat violet shades changing by oxidation to blue.

In testimony whereof we have hereunto set our hands.

PAUL NAWIASKY.
EMIL KRAUCH.